United States Patent
Yoshimoto et al.

(10) Patent No.: US 12,248,283 B2
(45) Date of Patent: Mar. 11, 2025

(54) WORK CONTROL METHOD, WORK CONTROL SYSTEM, AND WORK CONTROL APPARATUS OF CONSTRUCTION MACHINE

(71) Applicant: NEC Corporation, Tokyo (JP)

(72) Inventors: Tatsuya Yoshimoto, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 170 days.

(21) Appl. No.: 18/021,764

(22) PCT Filed: Jul. 15, 2021

(86) PCT No.: PCT/JP2021/026609
§ 371 (c)(1),
(2) Date: Feb. 16, 2023

(87) PCT Pub. No.: WO2022/070553
PCT Pub. Date: Apr. 7, 2022

(65) Prior Publication Data
US 2024/0027972 A1    Jan. 25, 2024

(30) Foreign Application Priority Data

Sep. 29, 2020 (JP) .................................. 2020-162900

(51) Int. Cl.
*G05B 13/02* (2006.01)
*E02F 9/20* (2006.01)

(52) U.S. Cl.
CPC .......... *G05B 13/021* (2013.01); *E02F 9/2025* (2013.01); *E02F 9/205* (2013.01)

(58) Field of Classification Search
CPC ...... G05B 13/021; G05B 13/02; G05B 11/36; E02F 9/2025; E02F 9/205; E02F 9/20
See application file for complete search history.

(56) References Cited

U.S. PATENT DOCUMENTS

2011/0022232 A1 * 1/2011 Yoshiike .............. B62D 57/032
                                                                   700/260
2020/0024828 A1   1/2020 Asada et al.

FOREIGN PATENT DOCUMENTS

CA        2243266 C  * 10/2003  .............. E02F 3/437
JP    H02-245902 A    10/1990
(Continued)

OTHER PUBLICATIONS

International Search Report for PCT Application No. PCT/JP2021/026609, mailed on Sep. 28, 2021.

*Primary Examiner* — Michael J Zanelli
(74) *Attorney, Agent, or Firm* — Sughrue Mion, PLLC

(57) ABSTRACT

A feedback control processing for computing a feedback control input value for controlling the posture of a construction machine using the control gain, in which a control parameter adjustment processing includes: overshoot computation processing for computing an amount of overshoot of a posture detection value with respect to a target position in a previous control section; addition/subtraction rate computation processing for computing a control gain addition/subtraction rate, which is an addition/subtraction rate of the control gain in the next control section, based on the amount of overshoot; addition/subtraction rate smoothing processing for computing a post-smoothing addition/subtraction rate in which the control gain addition/subtraction rate is smoothed based on a post-smoothing addition-subtraction rate computed in the previous control section and the control gain addition/subtraction rate; and control gain computation processing for computing the control gain in the next control section from the post-smoothing addition/subtraction rate.

19 Claims, 13 Drawing Sheets

(56) References Cited

FOREIGN PATENT DOCUMENTS

| JP | H04-75113 A | 3/1992 |
|---|---|---|
| JP | 2003-061377 A | 2/2003 |
| JP | 2011-006862 A | 1/2011 |

* cited by examiner

WORK CONTROL METHOD, WORK CONTROL SYSTEM, AND WORK CONTROL APPARATUS OF CONSTRUCTION MACHINE This application is a National Stage Entry of PCT/JP2021/026609 filed on Jul. 15, 2021, which claims priority from Japanese Patent Application 2020-162900 filed on Sep. 29, 2020, the contents of all of which are incorporated herein by reference, in their entirety.

TECHNICAL FIELD

The present invention relates to a work control method, a work control system, and a work control apparatus of a construction machine, and in particular, to a work control method, a work control system, and a work control apparatus of a construction machine that controls the posture of the construction machine by numerical control using a computer.

BACKGROUND ART

In recent years, technology developments related to remote control and automatic control of construction machines have been advancing. When these kinds of control are performed, feedback control represented by PID control is performed. In this feedback control, before a control target position converges to a target value, overshoot above the target value occurs. In construction machines, severe overshoot causes problems such as machine vibration, collision with obstacles, destruction of objects, etc. Therefore, it is required to reduce occurrence of overshoot in the feedback control of the construction machine. Patent Literature 1 and 2 disclose examples of techniques for reducing occurrence of overshoot.

A motor control apparatus disclosed in Patent Literature 1 includes a response diagnostic unit that receives a positional deviation and diagnoses a positioning time and vibration during overshoot and servo lock, a gain adjustment unit that performs adjustment of a position control unit, a speed control unit, a torque filter unit, a current control unit, a speed signal creation unit, a speed feedforward compensation unit, and a torque feedforward compensation unit based on the result of the diagnosis, and a tuning end determination unit that automatically tunes an optimal control gain by repeating a cycle of driving a motor again based on the adjusted gain several times and determines that the tuning is ended when a predetermined evaluation function becomes smaller than a preset value.

A process control apparatus disclosed in Patent Literature 2 is a process control apparatus that provides feedback control of a control amount of a process to a target value and performs at least proportional and integral control, the process control apparatus including computation means for observing a control deviation between the target value and the control amount, the control deviation occurring due to a change in the target value or an application of disturbance, by a waveform, time-integrating the absolute value of the control deviation for each half cycle, and computing the size value, and correction means for adjusting a control parameter by a predetermined adjustment rule using the size value.

CITATION LIST

Patent Literature

[Patent Literature 1] Japanese Unexamined Patent Application Publication No. 2003-061377
[Patent Literature 2] Japanese Unexamined Patent Application Publication No. H02-245902

SUMMARY OF INVENTION

Technical Problem

In a construction machine, there is a problem that it is difficult to perform appropriate control for each work since control properties required for a control target position differ for each type of work. For example, some work requires a large torque, other work requires a high accuracy even when the magnitude of the torque is small, and other work requires both a large torque and a high accuracy. According to the techniques disclosed in Patent Literature 1 and 2, however, it is impossible to address a change in the control properties for each work. That is, according to the techniques disclosed in Patent Literature 1 and 2, there is a problem that both a high control accuracy of a construction machine and a high work efficiency cannot be achieved.

Solution to Problem

One aspect of a work control method of a construction machine according to the present invention includes: control parameter adjustment processing for adjusting a control gain for each control section, which is a unit section of control; and feedback control processing for computing a feedback control input value for controlling the posture of a construction machine using the control gain, in which, in the control parameter adjustment processing includes overshoot computation processing for computing an amount of overshoot of a posture detection value with respect to a target position in a previous control section; addition/subtraction rate computation processing for computing a control gain addition/subtraction rate, which is an addition/subtraction rate of the control gain in the next control section, based on the amount of overshoot; addition/subtraction rate smoothing processing for computing a post-smoothing addition/subtraction rate in which the control gain addition/subtraction rate is smoothed based on a post-smoothing addition-subtraction rate computed in the previous control section and the control gain addition/subtraction rate; and control gain computation processing for computing the control gain in the next control section from the post-smoothing addition/subtraction rate.

One aspect of a work control system of a construction machine according to the present invention includes: a control parameter adjustment unit configured to adjust a control gain for each control section, which is a unit section of control; a feedback control unit configured to compute a feedback control input value for controlling the posture of a construction machine using the control gain; and a construction machine control unit configured to control the posture of the construction machine based on the feedback control input value, in which the control parameter adjustment unit includes: an overshoot computation unit configured to compute an amount of overshoot of a posture detection value with respect to a target position in a previous control section; an addition/subtraction rate computation unit configured to compute a control gain addition/subtraction rate, which is an addition/subtraction rate of the control gain in the next control section, based on the amount of overshoot; an addition/subtraction rate smoothing processing unit configured to compute a post-smoothing addition/subtraction rate in which the control gain addition/subtraction rate is smoothed based on a post-smoothing addition-subtraction rate computed in the previous control section and the control gain addition/subtraction rate; and a control gain computation unit configured to compute the control gain in the next control section from the post-smoothing addition/subtraction rate.

One aspect of a work control apparatus of a construction machine according to the present invention includes: a control parameter adjustment unit configured to adjust a control gain for each control section, which is a unit section of control; and a feedback control unit configured to compute a feedback control input value for controlling the posture of a construction machine using the control gain, in which the control parameter adjustment unit includes: an overshoot computation unit configured to compute an amount of overshoot of a posture detection value with respect to a target position in a previous control section; an addition/subtraction rate computation unit configured to compute a control gain addition/subtraction rate, which is an addition/subtraction rate of the control gain in the next control section, based on the amount of overshoot; an addition/subtraction rate smoothing processing unit configured to compute a post-smoothing addition/subtraction rate in which the control gain addition/subtraction rate is smoothed based on a post-smoothing addition-subtraction rate computed in the previous control section and the control gain addition/subtraction rate; and a control gain computation unit configured to compute the control gain in the next control section from the post-smoothing addition/subtraction rate.

Advantageous Effects of Invention

According to a work control method, a work control system, and a work control apparatus of a construction machine of the present invention, it is possible to control a construction machine during work with a high accuracy.

EXAMPLE EMBODIMENT

Figure 1:
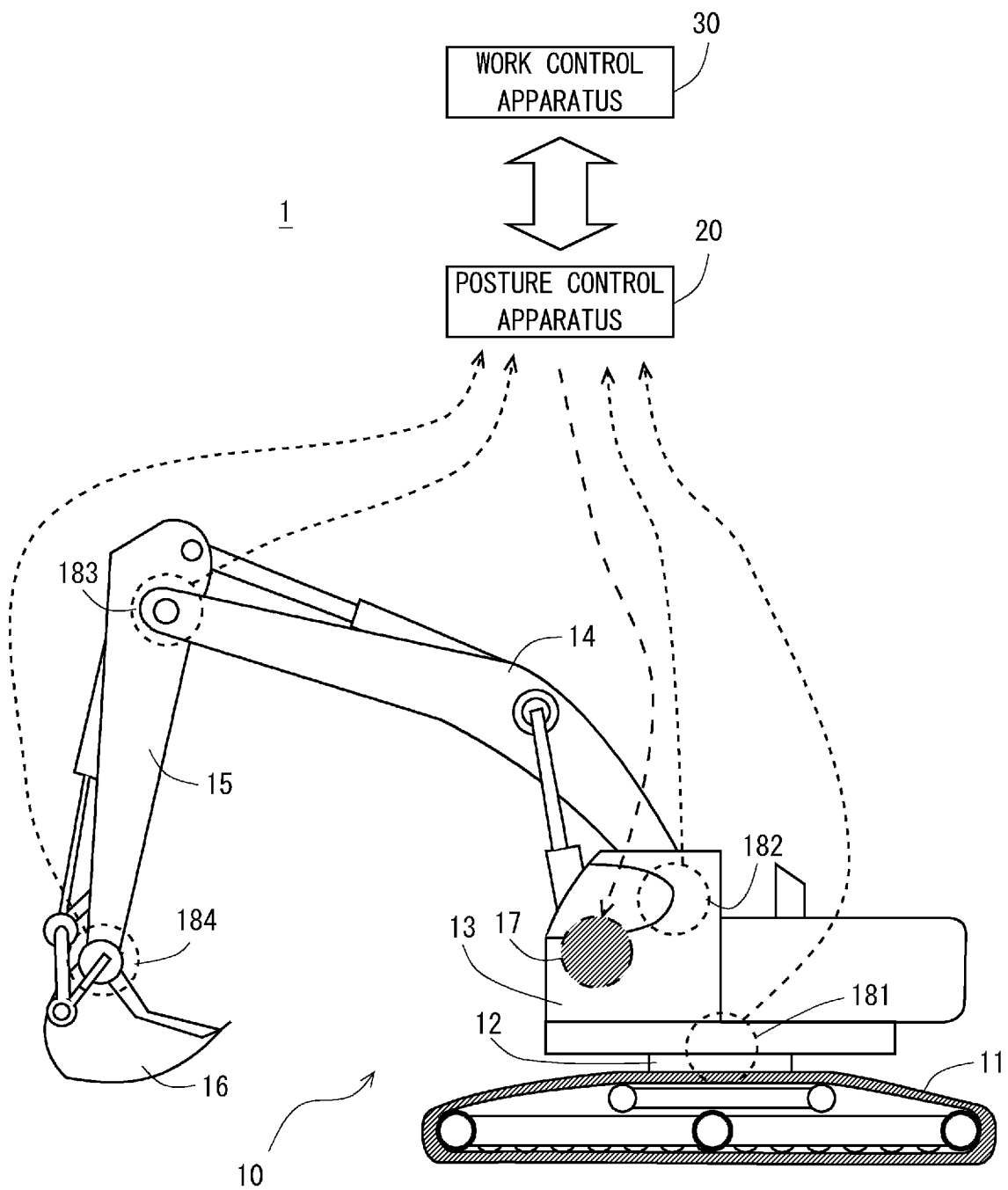
FIG. 1 is a schematic diagram of a construction machine to be controlled by a work control system according to a first example embodiment.

For clarity of explanation, the following descriptions and drawings will be appropriately omitted and simplified. Further, the respective components described in the drawings as functional blocks which perform various kinds of processing can be configured by Central Processing Units (CPUs), memories or other circuits in terms of hardware, and are achieved by programs loaded in memories, or the like in terms of software. Accordingly, it will be understood by those skilled in the art that these functional blocks can be implemented in various forms by only hardware, only software or a combination thereof. They are not limited to any of them. Incidentally, in the respective drawings, the same components are denoted by the same reference numerals, and dual description will be omitted as needed.

Further, the above-described program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

First Example Embodiment

Hereinafter, with reference to the drawings, example embodiments of the present invention will be described. A work control method, a work control system, and a work control apparatus of a construction machine described below control a construction machine that drives joints of a machine using a cylinder. The following description will be made taking a backhoe as an example of the construction machine. Further, while a work control system in which process blocks that perform work control processing are arranged in a plurality of places in a distributed manner via a network will be described in the following description, a work control apparatus in which the process blocks included in the work control system are formed of one apparatus may be employed. Further, the content of the control performed in the work control system will be referred to as a work control method.

Further, the work control system that will be described below may be applied to a machine having a manipulation lever that can be operated by a worker as a construction machine or may be applied to a machine that directly controls a drive mechanism using, for example, an electromagnetic proportional valve by an electrical signal without using a manipulation lever.

FIG. 1 shows a schematic diagram of a construction machine controlled by a work control system 1 according to the first example embodiment. A construction machine 10 shown in FIG. 1 is a backhoe. The construction machine includes a crawler 11, a turning base 12, a cockpit 13, a boom 14, an arm 15, and a bucket 16. The crawler 11 is a caterpillar for moving the construction machine 10. The turning base 12 turns a chassis on which the cockpit 13, the boom 14 and the like are mounted. The cockpit 13 is a manipulation room in which a manipulation lever and the like for manipulating the posture of the construction machine 10 are disposed. Further, while the drawings are omitted, in the work control system 1, a construction machine drive processing unit 17 is disposed in the construction machine 10. Further, each of the boom 14, the arm and the bucket 16 corresponds to a movable part and is operated by a hydraulic cylinder. This hydraulic cylinder is elongated or contracted by an action of the construction machine drive processing unit 17. Note that the part that corresponds to the movable part includes, for example, besides the hydraulic cylinder, a part that is driven by the motor.

Note that the construction machine drive processing unit 17 may operate, for example, an actuator that displaces a manipulation lever operable by a worker or may operate an electromagnetic proportional valve or the like by an electrical signal.

The work control system 1 according to the first example embodiment provides a feedback control input value for the construction machine drive processing unit 17 of the construction machine 10, thereby moving the movable parts such as the boom 14 of the construction machine 10. Then, the work control system 1 according to the first example embodiment performs feedback control while adjusting the control gain used in feedback control for each predetermined control section. In the following, the work control system 1 according to the first example embodiment will be described in detail.

Figure 2:
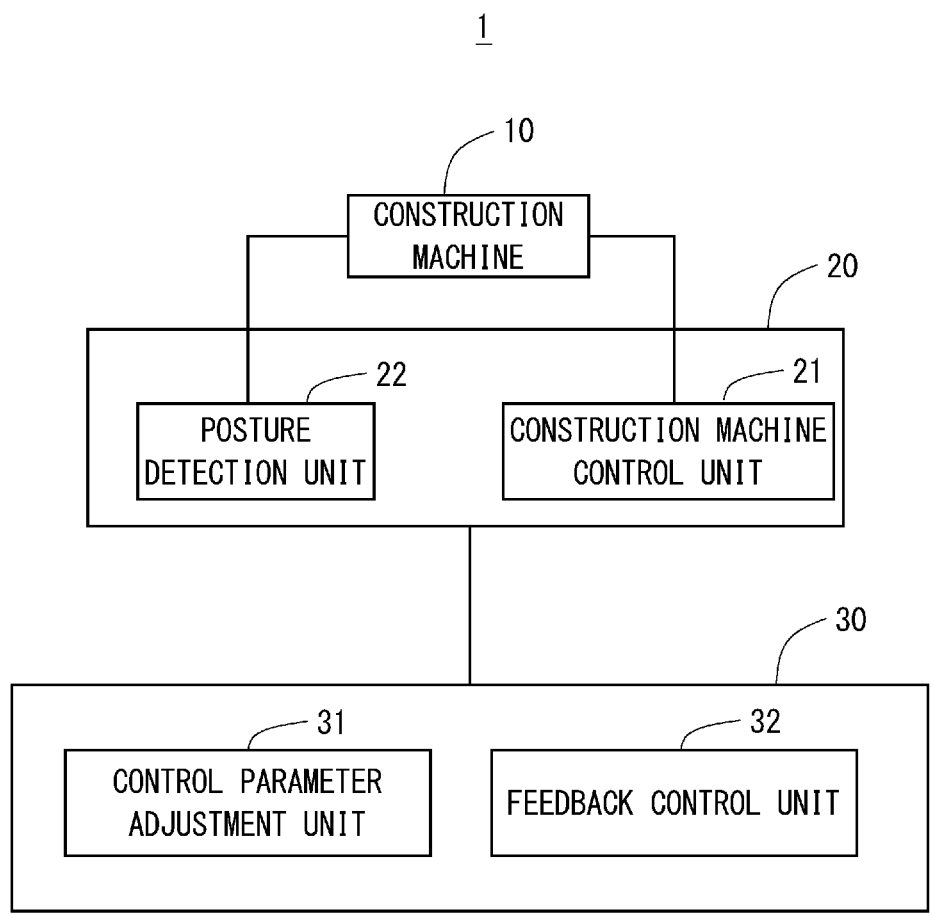
FIG. 2 is a schematic block diagram of the work control system according to the first example embodiment.

First, a configuration of a process block of the work control system 1 according to the first example embodiment will be described. FIG. 2 shows a schematic block diagram of the work control system according to the first example embodiment. The construction machine 10 is shown in FIG. 2 as a target to be controlled by the work control system 1. In the example shown in FIG. 2, the posture control apparatus 20 is provided with a construction machine control unit 21 and a posture detection unit 22. The work control apparatus 30 is provided with a control parameter adjustment unit 31 and a feedback control unit 32. The construction machine 10 is manipulated using the posture control apparatus 20 and the work control apparatus 30. The example shown in FIG. 2 is merely one example. For example, the posture control apparatus 20 and the work control apparatus 30 may be integrated as one apparatus and the construction machine 10 and the posture control apparatus 20 may be connected to each other by communication. Further, the posture control apparatus 20 may be provided in such a way that the posture control apparatus 20 and the construction machine 10 are integrated with each other to obtain a form in which the posture control apparatus 20 and the work control apparatus 30 are connected to each other by communication. Further, the construction machine 10 is a target to be controlled by the work control apparatus 30 and the posture control apparatus 20 may be an interface for allowing the work control apparatus 30 to actually operate the construction machine 10. In this case, it can be considered that the work control apparatus 30 is a main part of the work control system 1.

The posture control apparatus 20 includes the construction machine control unit 21 and the posture detection unit 22. The construction machine control unit 21 provides a feedback control input value computed by the feedback control unit 32 for the construction machine drive processing unit 17, thereby operating the movable part of the construction machine 10. The posture detection unit 22 acquires joint angles of the respective movable parts from sensors provided in the movable parts such as the arm of the construction machine and outputs the acquired joint angles as posture detection values indicating the posture of the construction machine 10.

The work control apparatus 30 includes the control parameter adjustment unit 31 and the feedback control unit 32. The control parameter adjustment unit 31 adjusts the control gain for each control section, which is a unit section of control. Further, the control parameter adjustment unit 31 adjusts the control gain for each control section based on the posture detection value detected by the posture detection unit 22. The details of the processing of adjusting the control gain will be described later. The feedback control unit 32 computes the feedback control input value for controlling the posture of the construction machine using the control gain computed by the control parameter adjustment unit 31 and the posture detection value acquired from the posture detection unit 22. The feedback control unit 32 performs processing of generating the feedback control input value by PID control or the like using the posture detection value.

Note that the feedback control input value may be generated for each of the movable parts of the construction machine 10 or may include input values for the plurality of movable parts. It is further assumed that the work control system 1 computes an input value using parameters that are different from each other for each movable part.

Figure 3:
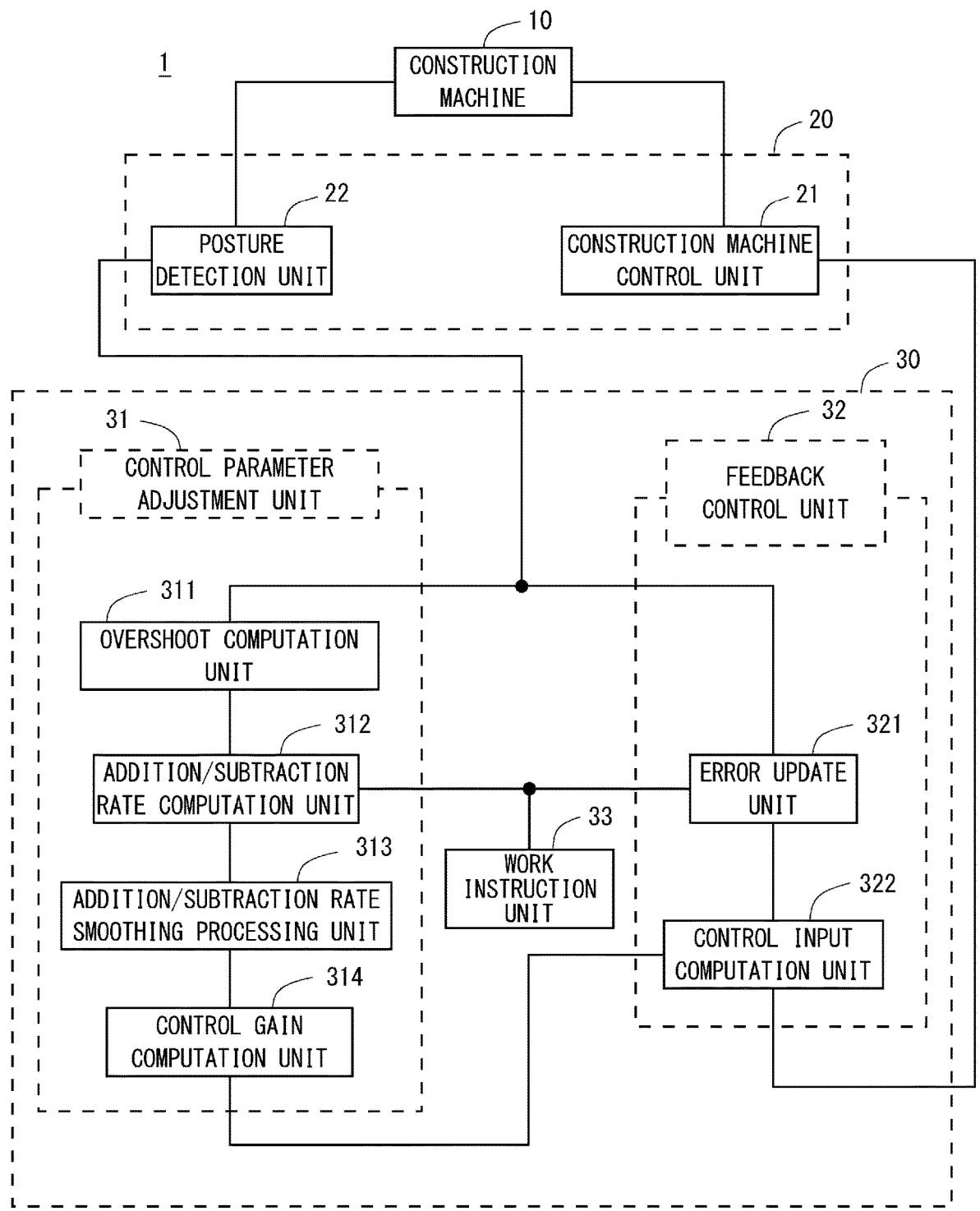
FIG. 3 is a detailed block diagram of the work control system according to the first example embodiment.

FIG. 3 shows a detailed block diagram of the work control system 1 according to the first example embodiment. FIG. 3 shows the construction machine 10, the construction machine control unit 21, and the posture detection unit 22 already described above in order to indicate a flow of information exchanged between blocks. As shown in FIG. 3, the work control apparatus 30 includes the control parameter adjustment unit 31, the feedback control unit 32, and a work instruction unit 33. The work instruction unit 33 provides a work instruction indicating the content of the work to be performed by the construction machine 10 for the control parameter adjustment unit 31 and the feedback control unit 32. In the following, in particular, the control parameter adjustment unit 31 and the feedback control unit 32 will be described in detail.

The control parameter adjustment unit 31 includes an overshoot computation unit 311, an addition/subtraction rate computation unit 312, an addition/subtraction rate smoothing processing unit 313, and a control gain computation unit 314. The overshoot computation unit 311 computes an amount of overshoot of a posture detection valve with respect to a target position in a previous control section. This posture detection value is output from the posture detection unit 22. The addition/subtraction rate computation unit 312 computes a control gain addition/subtraction rate, which is an addition/subtraction rate of the control gain in the next control section, based on the amount of overshoot.

The addition/subtraction rate smoothing processing unit 313 computes a post-smoothing addition/subtraction rate in which the control gain addition/subtraction rate is smoothed using the smoothing coefficient switched based on an increasing/decreasing direction of the control gain addition/subtraction rate determined by the post-smoothing addition-subtraction rate computed in the previous control section and the control gain addition/subtraction rate computed by the addition/subtraction rate computation unit 312. The control gain computation unit 314 computes the control gain in the next control section from the post-smoothing addition/subtraction rate.

Figure 4:
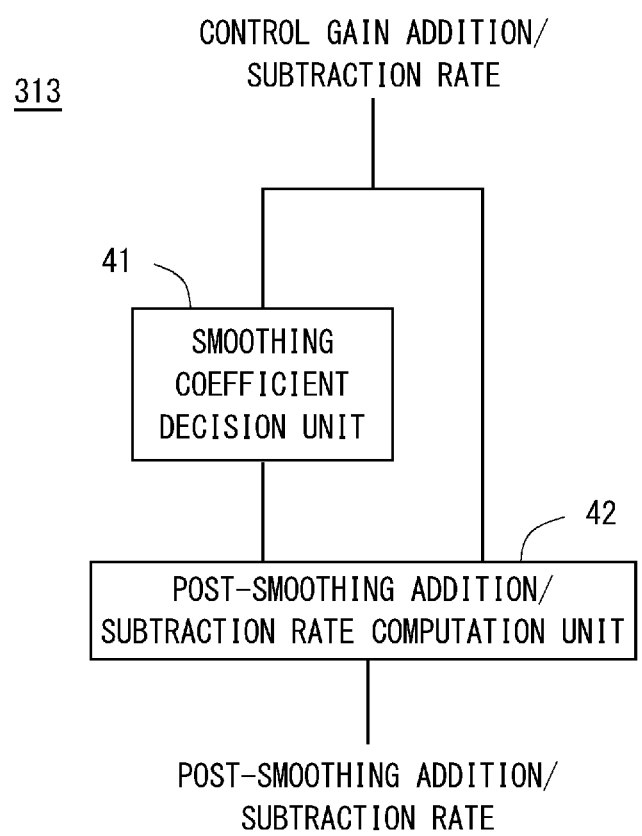
FIG. 4 is a block diagram of an addition/subtraction rate smoothing processing unit according to the first example embodiment.

FIG. 4 shows a more detailed block diagram of the addition/subtraction rate smoothing processing unit 313. As shown in FIG. 4, the addition/subtraction rate smoothing processing unit 313 includes a smoothing coefficient decision unit 41 and a post-smoothing addition/subtraction rate computation unit 42. The smoothing coefficient decision unit 41 rewrites, when the control gain addition/subtraction rate is larger than the post-smoothing addition/subtraction rate computed in the previous control section, the smoothing coefficient in such a way that the smoothing coefficient becomes a smaller value, and outputs the smoothing coefficient.

The work control system 1 according to the first example embodiment treats, as the smoothing coefficient, a combination of a large value and a small value as one set. Further, the work control system 1 according to the first example embodiment holds a plurality of sets of smoothing coefficients in accordance with the difference in the control target position or the content of the work instruction in a system in advance.

The post-smoothing addition/subtraction rate computation unit 42 performs smoothing processing in which the smoothing coefficient decided by the smoothing coefficient decision unit 41 is applied to the control gain addition/subtraction rate that corresponds to the previous control section and the control gain addition/subtraction rate that corresponds to the next control section, and thus computes the post-smoothing addition/subtraction rate.

The feedback control unit 32 includes an error update unit 321 and a control input computation unit 322. The error update unit 321 computes an error between the target position included in the instruction indicating the content of the work obtained from the work instruction unit 33 and the posture detection value obtained from the posture detection unit 22. The control input computation unit 322 computes the feedback control input value for controlling the posture of the construction machine using the control gain computed by the control gain computation unit 314. At this time, the control input computation unit 322 computes the feedback control input value in such a way that the error computed by the error update unit 321 is made close to zero.

The operation of the above-mentioned process block will be described in more detail. In the following, an example in which a period from when the target position is set to when it is changed next time is set as the control section will be described. Further, in the following description, one of the control target positions is targeted. In the work control system 1 according to the first example embodiment, the operation that will be described below is performed for each control target position.

Figure 5:
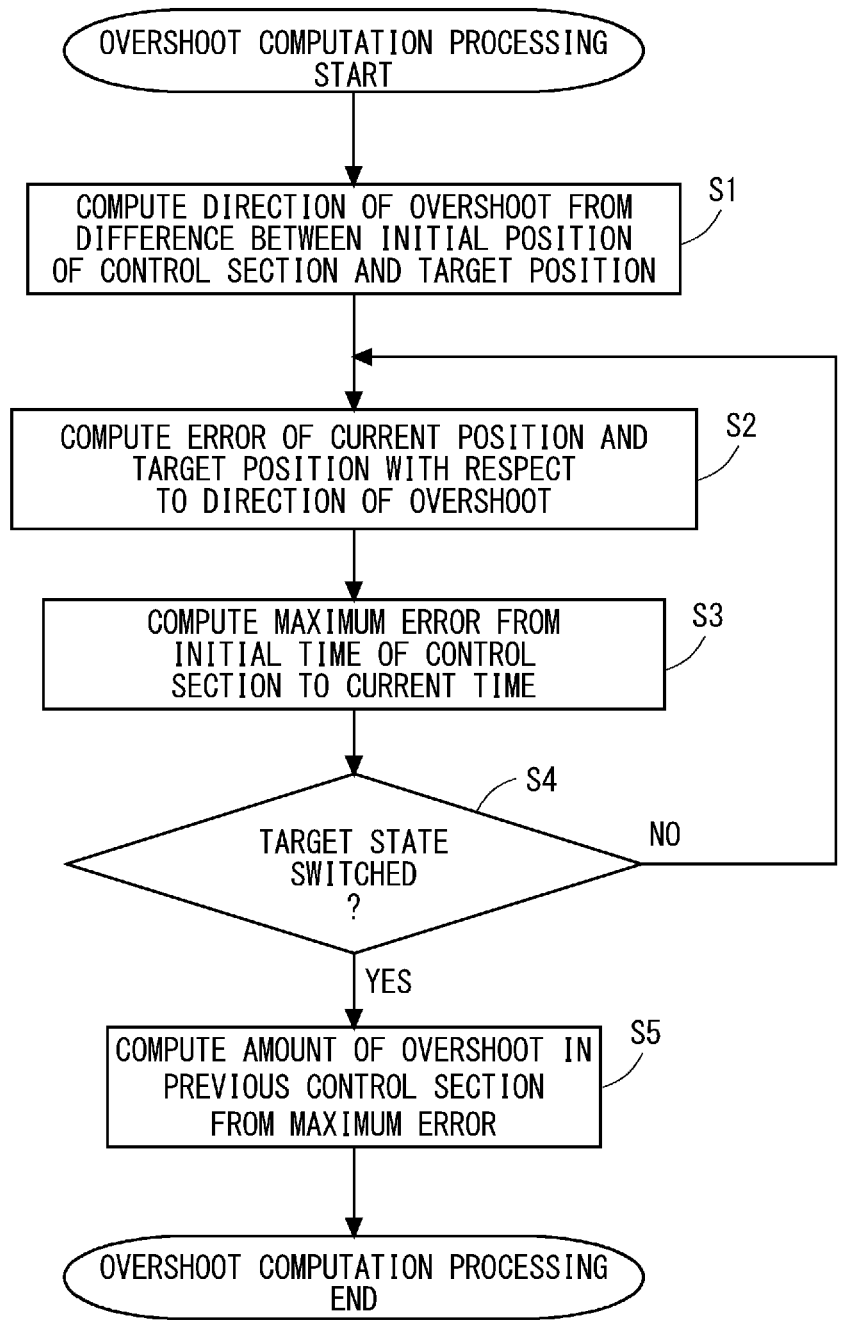
FIG. 5 is a flowchart for describing overshoot computation processing according to the first example embodiment.

First, overshoot computation processing performed by the overshoot computation unit 311 will be described. FIG. 5 shows a flowchart for describing overshoot computation processing according to the first example embodiment. As shown in FIG. 5, in the overshoot computation processing according to the first example embodiment, first, the direction of the overshoot is computed from the difference between the initial position of the control section and the target position (Step S1). Next, the error of the current position of the control target position grasped from the posture detection value and the target position with respect to the direction of the overshoot is computed (Step S2). Next, the maximum error from the initial time of the control section to the current time is computed (Step S3). Then, the processing of Steps S2 and S3 is repeated until the target position is switched (Step S4). When it is determined in this Step S4 that the target position has been switched, the overshoot computation unit 311 computes the maximum error detected through Steps S2-S4 as the amount of overshoot in the previous control section (Step S5).

Figure 6:
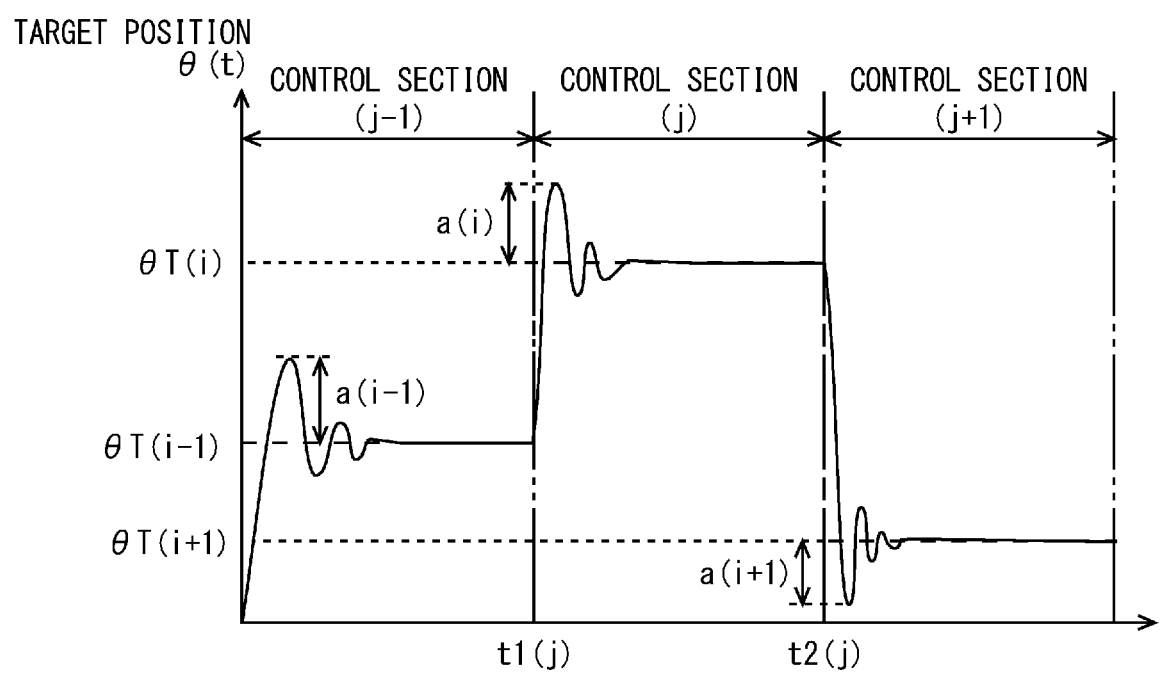
FIG. 6 is a timing chart for describing the magnitude of overshoot addressed in overshoot computation processing.

The flowchart shown in FIG. 5 will be described using a timing chart indicating the change in the current position. FIG. 6 shows a timing chart for describing the magnitude of overshoot addressed in the overshoot computation processing. As shown in FIG. 6, in the first example embodiment, the control section is switched every time the target position is switched. For example, in the example shown in FIG. 6, a period from a time t1(j) when θT(i) is set as the target position to a time t2(j) is set to be a control section j.

The overshoot computation unit 311 determines, in the computation of the direction of the overshoot in Step S1, the position of the control target position of the start time of the control section based on the difference between θ(t1(j)) and the target position θT(i) in the control section j. The overshoot computation unit 311 further computes, in Step S2, the error in the direction determined in Step S1. The overshoot computation unit 311 further continuously acquires the local maximum value of the overshoot in the direction that is the same as the direction in which the target position changes during the control section. When the error with respect to the target position θT(i) is denoted by $e_i(t)$, the error $e_i(t)$ is expressed by Expression (1). In Step S3, the error e(i) is accumulated every time the local maximum value of the overshoot occurs.

[Expression 1]

$$e_i(t) = \begin{cases} \max\{\theta(t) - \theta T(i), 0\} & \text{if } \theta(t1(j)) \leq \theta T(i) \\ \max\{\theta T(i) - \theta(t), 0\} & \text{others} \end{cases} \quad (1)$$

After that, at a timing when the control section is ended, the overshoot computation unit 311 computes, using Expression (2), the maximum value a(j) of the error during the control period j (the period from t1(j) to t2(j)) and computes the computed maximum value as the amount of overshoot a(j).

[Expression 2]

$$a(j) = \sup e_i(t) \ t \in [t1(j), t2(j)] \quad (2)$$

Figure 7:
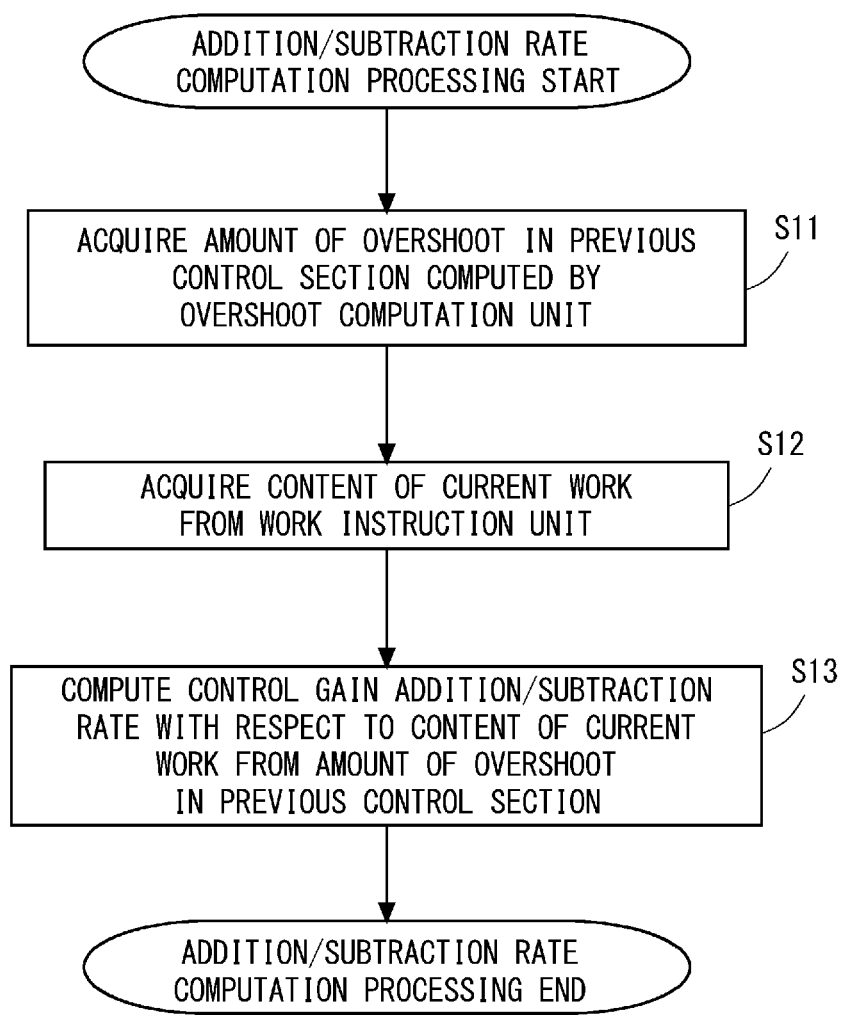
FIG. 7 is a flowchart for describing addition/subtraction rate computation processing according to the first example embodiment.

Next, an operation of the addition/subtraction rate computation unit 312 according to the first example embodiment will be described in detail. FIG. 7 shows a flowchart for describing addition/subtraction rate computation processing according to the first example embodiment. As shown in FIG. 7, the addition/subtraction rate computation unit 312 acquires the amount of overshoot in the previous control section computed by the overshoot computation unit 311 (Step S11). Next, the addition/subtraction rate computation unit 312 acquires the content of the current work from the work instruction unit 33 (Step S12). After that, the addition/subtraction rate computation unit 312 computes the control gain addition/subtraction rate with respect to the content of the current work from the amount of overshoot in the previous control section (Step S13).

When the amount of overshoot is denoted by a(j), a weight coefficient set to have a desired magnitude is denoted by to, and the control gain addition/subtraction rate that corresponds to the control section j is denoted by r(j), the control gain addition/subtraction rate can be expressed by Expression (3).

[Expression 3]

$$r(j)=1+\omega \cdot a(j) \qquad (3)$$

Figure 8:
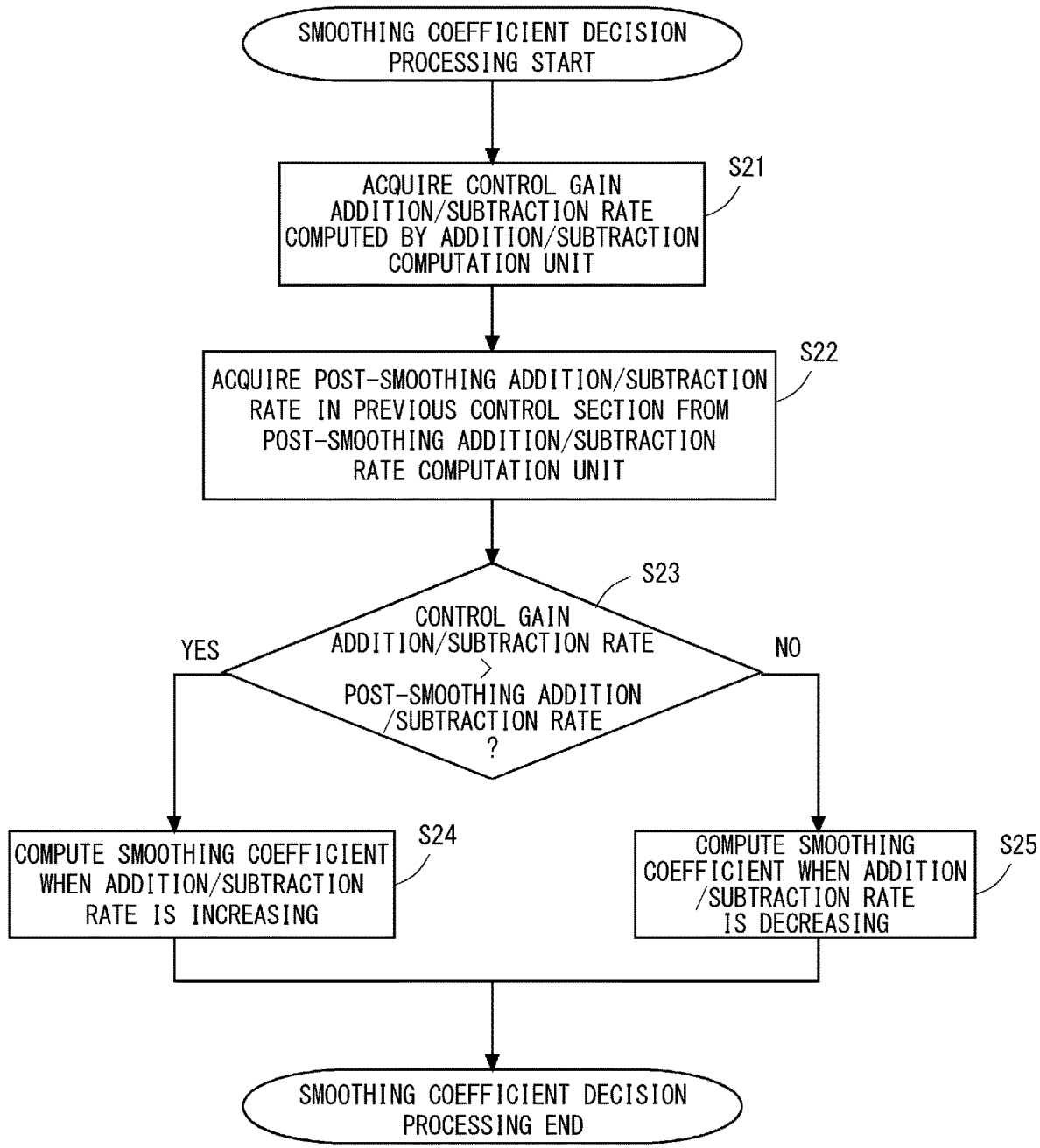
FIG. 8 is a flowchart for describing smoothing coefficient decision processing according to the first example embodiment.

Next, an operation of the smoothing coefficient decision unit 41 according to the first example embodiment will be described in detail. FIG. 8 shows a flowchart for describing the smoothing coefficient decision processing according to the first example embodiment. As shown in FIG. 8, the smoothing coefficient decision unit 41 acquires the control gain addition/subtraction rate computed by the addition/subtraction rate computation unit 312 (Step S21). Next, the smoothing coefficient decision unit 41 acquires the post-smoothing addition/subtraction rate in the previous control section from the post-smoothing addition/subtraction rate computation unit 42 (Step S22). Then, the smoothing coefficient decision unit 41 compares the magnitude of the control gain addition/subtraction rate acquired in Step S21 and that of the post-smoothing addition/subtraction rate acquired in Step S22 (Step S23).

When the control gain addition/subtraction rate is larger than the post-smoothing addition/subtraction rate in Step S23, the smoothing coefficient decision unit 41 determines that the addition/subtraction rate is increasing and sets the smoothing coefficient $\alpha$ when the increase rate increases to be the smoothing coefficient when the increase rate increases to be used to compute the control gain in the next control section (Step S24). On the other hand, when the control gain addition/subtraction rate is equal to or smaller than the post-smoothing addition/subtraction rate in Step S23, the smoothing coefficient decision unit 41 determines that the addition/subtraction rate is decreasing and sets the smoothing coefficient $\beta$ when the increase rate decreases to be the smoothing coefficient when the increase rate increases to be used to compute the control gain in the next control section (Step S25). The smoothing coefficient $\alpha$ and the smoothing coefficient $\beta$ have a relation $\alpha<\beta$.

Figure 9:
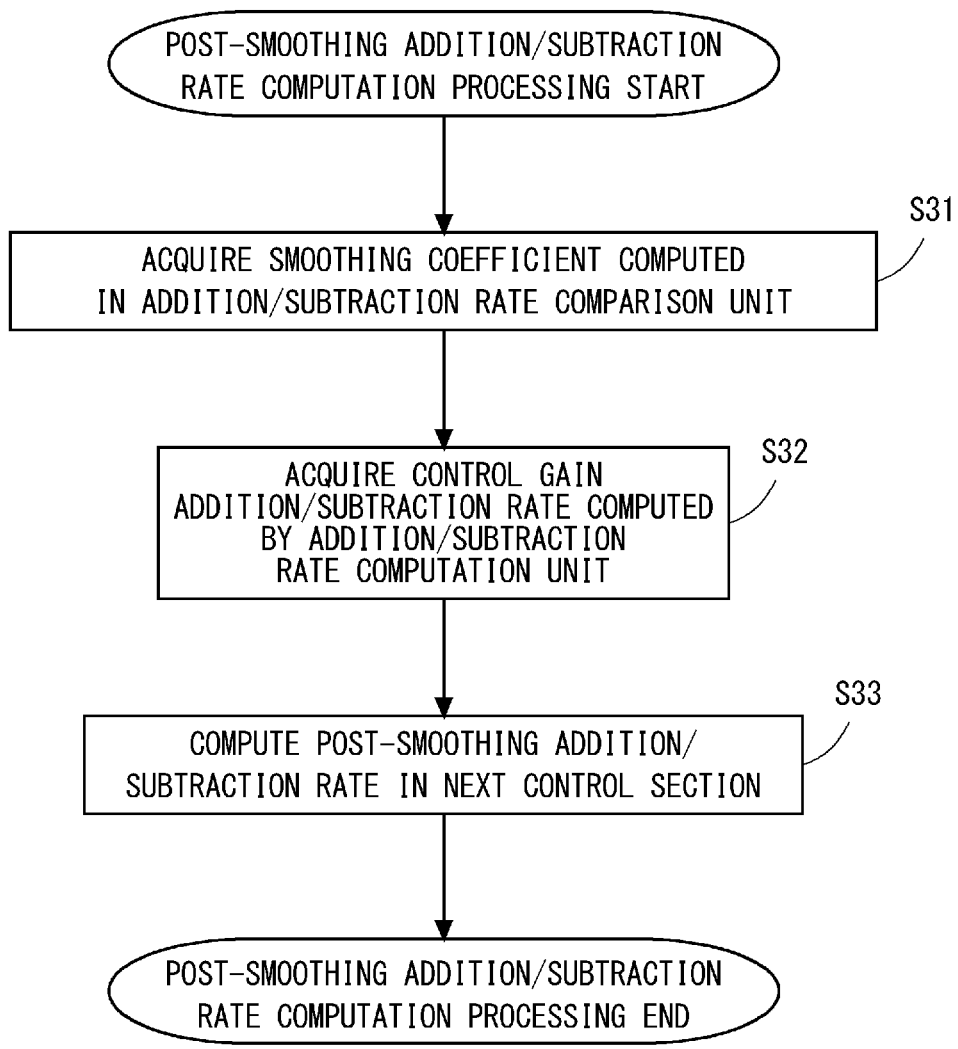
FIG. 9 is a flowchart for describing smoothing addition/subtraction rate computation processing according to the first example embodiment.

Next, an operation of the post-smoothing addition/subtraction rate computation unit 42 according to the first example embodiment will be described in detail. FIG. 9 shows a flowchart for describing the smoothing addition/subtraction rate computation processing according to the first example embodiment. As shown in FIG. 9, the post-smoothing addition/subtraction rate computation unit 42 acquires the smoothing coefficient computed in the smoothing coefficient decision unit 41 (Step S31). Further, the post-smoothing addition/subtraction rate computation unit 42 acquires the control gain addition/subtraction rate computed by the addition/subtraction rate computation unit 312 (Step S32). Then, the post-smoothing addition/subtraction rate computation unit 42 computes the post-smoothing addition/subtraction rate in the next control section using the values acquired in Steps S31 and S32 (Step S33).

In the work control system 1 according to the first example embodiment, the smoothing coefficient computed in the smoothing coefficient decision unit 41 varies depending on the increasing/decreasing direction of the control gain addition/subtraction rate. The post-smoothing addition/subtraction rate computed in Step S33 is computed either by Expression (4) or Expression (5) depending on the difference in the increasing/decreasing direction of the control gain addition/subtraction rate. Expression (4) is an expression when the control gain addition/subtraction rate increases and Expression (5) is an expression when the control gain addition/subtraction rate decreases. Note that R(j) is a post-smoothing addition/subtraction rate in the control section j and R(j+1) is a post-smoothing addition/subtraction rate in the control section j+1, which is the next control section. Further, the post-smoothing addition/subtraction rate R(1) in the control section when the construction machine 10 starts operating is 1.

[Expression 4]

$$R(j+1)=\alpha \cdot R(j)+(1-\alpha) \cdot r(j) \qquad (4)$$

[Expression 5]

$$R(j+1)=\beta \cdot R(j)+(1-\beta) \cdot r(j) \qquad (5)$$

Figure 10:
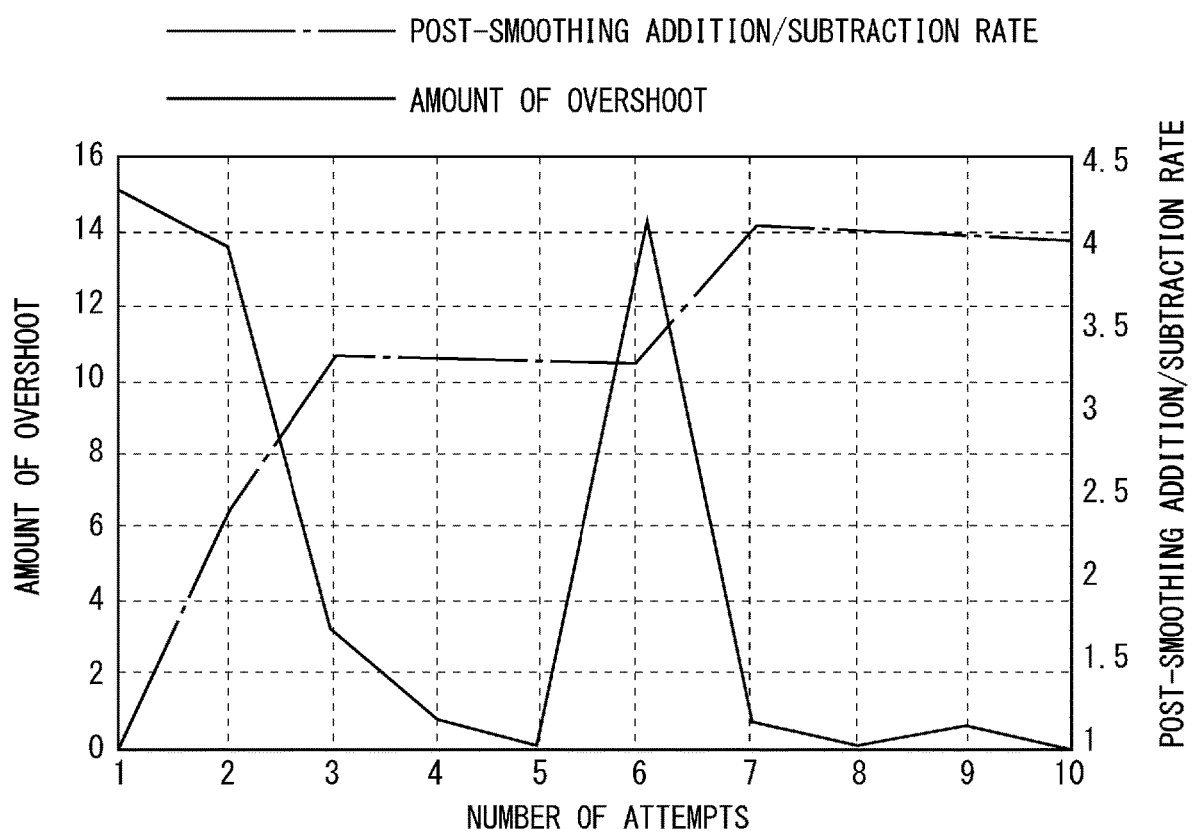
FIG. 10 is a graph describing a relation between an amount of overshoot and a smoothing addition/subtraction rate.

Now, a relation between the amount of overshoot and the smoothing addition/subtraction rate will be described. FIG. 10 shows a graph describing a relation between the amount of overshoot and the smoothing addition/subtraction rate. In the graph shown in FIG. 10, the processing is repeatedly executed for 10 control sections using the control parameter adjustment unit 31 according to the first example embodiment. In the graph in FIG. 10, the horizontal axis shows the number of control sections where the attempts have been repeated (the number of attempts), the vertical axis on the left side shows the amount of overshoot, and the vertical axis on the right side shows the post-smoothing addition/subtraction rate. Further, FIG. 10 shows the amount of overshoot by a solid line and the post-smoothing addition/subtraction rate by an alternate long and short dash line. Further, in the example shown in FIG. 10, the smoothing coefficient $\alpha$ where the amount of overshoot is large and that is selected in the direction in which the control gain addition/subtraction rate is increasing is set to be 0.8, and the smoothing coefficient $\beta$ where the amount of overshoot is small and that is selected in the direction in which the control gain addition/subtraction rate is decreasing is set to be 0.99.

In the example shown in FIG. 10, in the attempt period in which the number of attempts is one or two times, overshoot equal to or larger than a certain value continuously occurs. Therefore, the smoothing addition/subtraction rate to be applied to the control gain that corresponds to the second time and the third time significantly increases. Accordingly, the control gain decreases in the direction in which the amount of overshoot is suppressed.

Further, in the attempt period in which the number of attempts is three to five times, the amount of overshoot is suppressed to be equal to or smaller than a certain value. Therefore, the smoothing addition/subtraction rate to be applied to the control gain that corresponds to the fourth to sixth times gradually decreases. Accordingly, the operation speed of the construction machine 10 is maintained while the amount of overshoot is maintained so that it is suppressed to be equal to or smaller than the certain value.

Further, in the attempt period in which the number of attempts is six times, the amount of overshoot exceeds the certain value. Therefore, the smoothing addition/subtraction rate applied to the control gain that corresponds to the seventh attempt significantly increases. Accordingly, the control gain decreases in the direction in which the amount of overshoot is suppressed.

Further, in the attempt period in which the number of attempts is seven to ten times, the amount of overshoot is reduced to be equal to or smaller than the certain value. Therefore, the smoothing addition/subtraction rate to be applied to the control gain that corresponds to the eighth to eleventh times (the eleventh time is not shown) gradually decreases. Accordingly, the operation speed of the construction machine 10 is maintained while the amount of overshoot is maintained so that it is suppressed to be equal to or smaller than the certain value.

As described above, the work control system 1 according to the first example embodiment smooths the addition/subtraction rate to be applied to the computation of the control gain using the addition/subtraction rate computation unit 312, the smoothing coefficient decision unit 41, and the post-smoothing addition/subtraction rate computation unit 42, thereby adjusting the control gain in such a way that the control gain gradually increases when the amount of overshoot is small while immediately suppressing the amount of overshoot so that it is equal to or smaller than the certain value.

Figure 11:
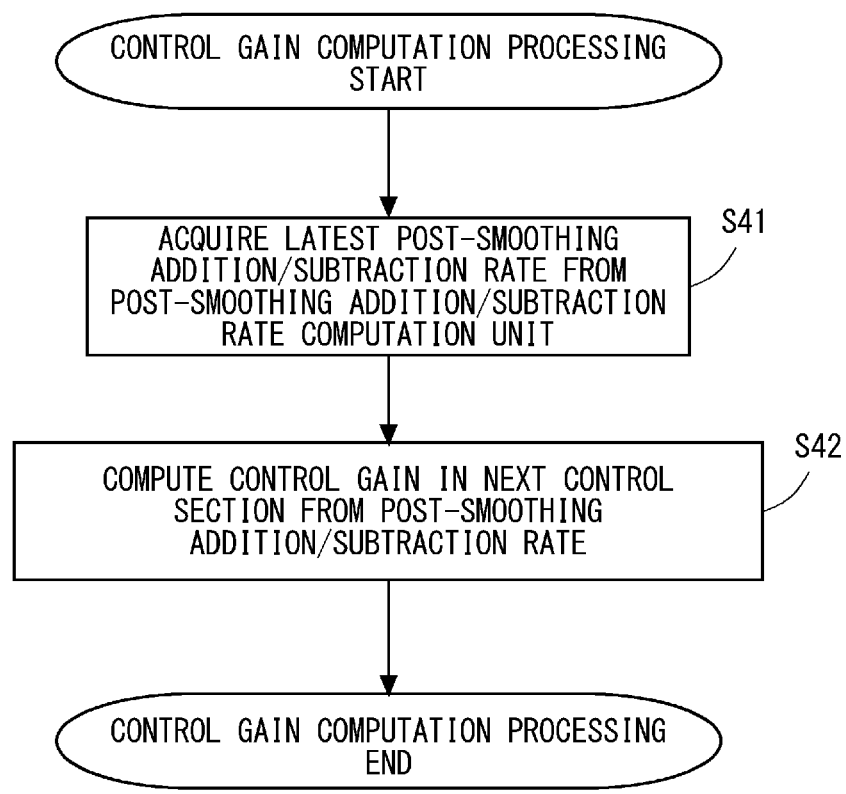
FIG. 11 is a flowchart for describing control gain computation processing according to the first example embodiment.

Next, the control gain computation unit 314 will be described. FIG. 11 shows a flowchart for describing control gain computation processing according to the first example embodiment. As shown in FIG. 11, the control gain computation unit 314 first acquires the latest post-smoothing addition/subtraction rate computed by the post-smoothing addition/subtraction rate computation unit 42 (Step S41). Next, the control gain computation unit 314 computes the control gain in the next control section using the post-smoothing addition/subtraction rate acquired in Step S41 (Step S42).

Now, the control gain computation processing in the control gain computation unit 314 will be described in further detail. In this example, the previous control section in which the maximum value of the amount of overshoot is acquired is denoted by j and the control section in which the control gain computed based on the result of the previous control section j is applied is set to be the next control section j+1. Further, the control gain that corresponds to the next control section j+1 is denoted by K(j+1), the initial value of the control gain is denoted by K(1), and the smoothing addition/subtraction rate that is computed based on the result of the previous control section j and is to be applied to the next control section j+1 is denoted by R(j+1). Under these conditions, the control gain computation unit 314 computes the control gain K(j+1) to be applied to the next control section j+1 based on Expression (6).

[Expression 6]

$$K(j+1)=K(1)/R(j+1) \quad (6)$$

Figure 12:
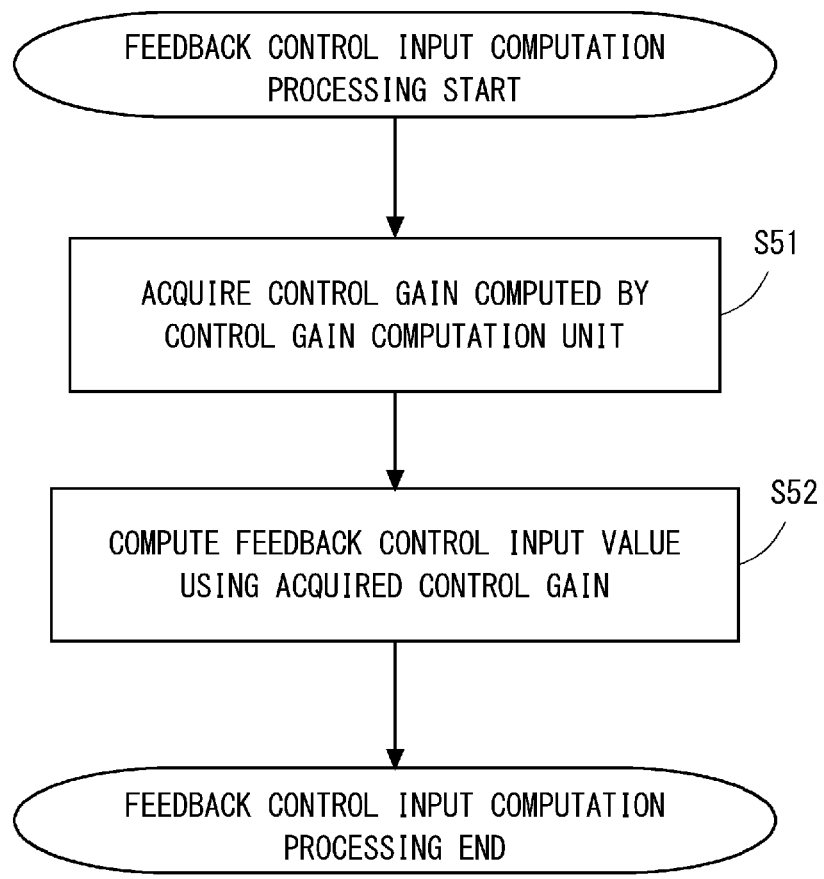
FIG. 12 is a flowchart for describing feedback control processing according to the first example embodiment.

Next, processing of computing the feedback control input value in the feedback control unit 32 will be described. The feedback control unit 32 includes an error update unit 321 and a control input computation unit 322. Then, the error update unit 321 computes an error between the posture detection value in real time and the target position. Then, the control input computation unit 322 computes a feedback control input value for making the error close to zero. The processing of computing the feedback control input value in the control input computation unit 322 will be described. FIG. 12 shows a flowchart for describing the feedback control processing according to the first example embodiment.

As shown in FIG. 12, the control input computation unit 322 first acquires the control gain computed by the control gain computation unit 314 (Step S51). Next, the control input computation unit 322 computes a feedback control input value using the acquired control gain (Step S52). That is, the feedback control unit 32 computes the feedback control input value based on the control gain updated by the control parameter adjustment unit 31.

From the above description, the work control system 1 according to the first example embodiment adjusts the magnitude of the control gain to be applied to the next control section based on the amount of overshoot that has occurred in the previous control section for each control section. That is, the work control system 1 according to the first example embodiment adjusts the control gain in accordance with the torque of each position or the content of the work that is changed during the operation of the construction machine 10. The content of the work includes, for example, extending the arm to an excavation site, inserting the cutting edge of the bucket into the excavation site, excavating, lifting, changing directions with the excavated earth and sand on the bucket, or releasing the earth and sand in the bucket. In these operations, the torque for moving the bucket or the arm in a state in which the bucket is filled with earth and sand is different from the torque for moving the bucket or the arm in a state in which the bucket is not filled with earth and sand. Further, the torque required during the excavation work is different from the torque required during other work. In the construction machine, the torque required for each part varies depending on the content of the work. The control gain is computed for each control section based on the amount of overshoot derived in the previous control section, like in the work control system 1 according to the first example embodiment. Accordingly, in the work control system 1 according to the first example embodiment, it is possible to reduce the amount of overshoot even when the torque required for each part increases or decreases.

Further, the work control system 1 according to the first example embodiment selects one of the smoothing coefficient α and the smoothing coefficient β by the post-smoothing addition/subtraction rate computation unit 42 in accordance with the result of comparing the smoothing addition/subtraction rate computed in the previous control section with the control gain addition/subtraction rate computed from the amount of overshoot that has occurred in the previous control section. Then the relation between the smoothing coefficient α and the smoothing coefficient β is set to be α<β. Accordingly, the work control system 1 according to the first example embodiment increases the sensitivity of the control gain in the decreasing direction and decreases the sensitivity of the control gain in the increasing direction. By performing this control, in the work control system 1 according to the first example embodiment, it is possible to perform control in such a way that the operation speed of the construction machine 10 is not unreasonably reduced while rapidly suppressing the magnitude of overshoot so that it is equal to or smaller than the certain value.

Further, the work control system 1 according to the first example embodiment switches the combination of smoothing coefficients selected by the post-smoothing addition/subtraction rate computation unit 42 in accordance with the part of the target to be controlled or the content of the work. Accordingly, the work control system 1 according to the first example embodiment is able to compute the optimal control gain in accordance with the content of the work or the required torque.

Second Example Embodiment

In a second example embodiment, another form of the method for setting the control sections will be described. In the first example embodiment, only one switch of target positions occur in one control section. In the second example embodiment, a plurality of switches of target positions occur in one control section. A method of computing an amount of overshoot when the switches of target positions occur will be described.

Figure 13:
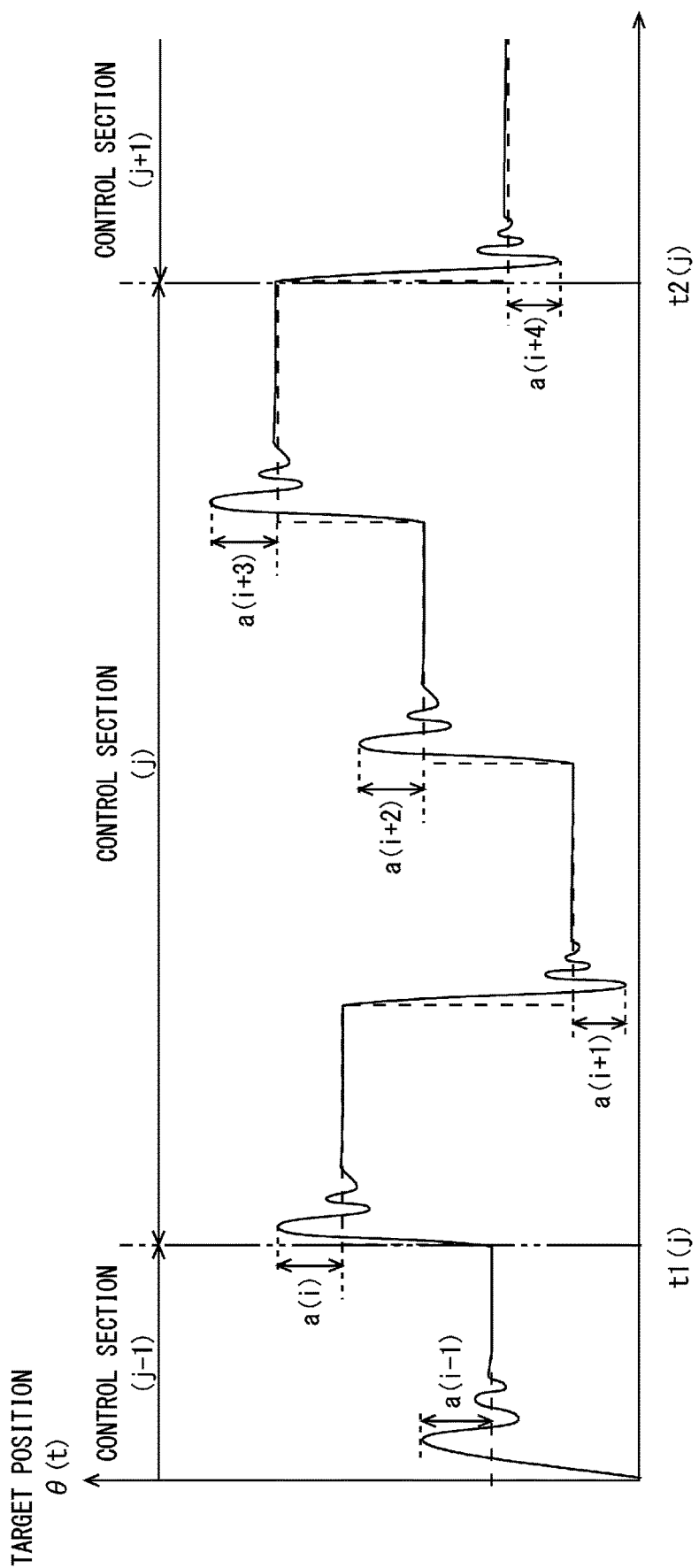
FIG. 13 is a timing chart for describing a relation between a control section and a target position according to a second example embodiment.

FIG. 13 shows a timing chart for describing a relation between the control section and the target position according to the second example embodiment. In the example shown in FIG. 13, four target position switches occur in a control section j from a time t1(j) to a time t2(j). The amounts of the overshoot that occur in the four target position switches are respectively denoted by a(i)-a(i+3). The amounts of overshoot a(i)-a(i+3) are computed in accordance with Expression (1). In the second example embodiment, the amounts of overshoot are computed in accordance with Expression (7) or (8) in place of Expression (2). Expression (7) is an expression in which the average value of the amounts of overshoot a(i)-a(i+3) that occur in the control period j is set to be the amount of overshoot a(j) in the control period. Expression (8) is an expression in which the maximum value of the amounts of overshoot a(i)-a(i+3) that occur in the control period j is set to be the amount of overshoot a(j) in the control period. In Expressions (7) and (8), n and k indicate the number of switches of the target value in one control period.

[Expression 7]
$$a(j) = \frac{1}{n}\sum_{k=0}^{n-1} a(i+k) \quad (7)$$

[Expression 8]
$$a(j) = \max\{a(i), a(i+1), \ldots, a(n-1)\} \quad (8)$$

From the above description, in the second example embodiment, the length of the control section may be set in a desired way and the period during which the control gain of the work control system 1 according to the first example embodiment is adjusted can be set in a flexible manner.

While the present invention has been described above with reference to the example embodiments, the present invention is not limited to the example embodiments. Various changes that can be understood by those skilled in the art within the scope of the present invention can be made to the configurations and the details of the present invention.

This application is based upon and claims the benefit of priority from Japanese Patent Application No. 2020-162900, filed on Sep. 29, 2020, the disclosure of which is incorporated herein in its entirety by reference.

REFERENCE SIGNS LIST

1 Work Control System
10 Construction Machine
11 Crawler
12 Turning Base
13 Cockpit
14 Boom
15 Arm
16 Bucket
17 Construction Machine Drive Processing Unit
181-184 Posture Sensor
20 Posture Control Apparatus
21 Construction Machine Control Unit
22 Posture Detection Unit
30 Work Control Apparatus
31 Control Parameter Adjustment Unit
32 Feedback Control Unit
311 Overshoot Computation Unit
312 Addition/subtraction Rate Computation Unit
313 Addition/subtraction Rate Smoothing Processing Unit
314 Control Gain Computation Unit
321 Error Update Unit
322 Control Input Computation Unit
33 Work Instruction Unit
41 Smoothing Coefficient Decision Unit
42 Post-smoothing Addition/subtraction Rate Computation Unit

What is claimed is:

1. A work control method comprising:
control parameter adjustment processing for adjusting a control gain for each control section, which is a unit section of control; and
feedback control processing for computing a feedback control input value for controlling the posture of a construction machine using the control gain, wherein the control parameter adjustment processing includes:
overshoot computation processing for computing an amount of overshoot of a posture detection value with respect to a target position in a previous control section;
addition/subtraction rate computation processing for computing a control gain addition/subtraction rate, which is an addition/subtraction rate of the control gain in the next control section, based on the amount of overshoot;
addition/subtraction rate smoothing processing for computing a post-smoothing addition/subtraction rate in which the control gain addition/subtraction rate is smoothed based on a post-smoothing addition-subtraction rate computed in the previous control section and the control gain addition/subtraction rate; and
control gain computation processing for computing the control gain in the next control section from the post-smoothing addition/subtraction rate.

2. The work control method according to claim 1, wherein the addition/subtraction rate smoothing processing includes:
smoothing coefficient decision processing for rewriting, when the control gain addition/subtraction rate is larger than the post-smoothing addition/subtraction rate computed in the previous control section, a smoothing coefficient in such a way that the smoothing coefficient becomes a small value and then outputting the smoothing coefficient; and
post-smoothing addition/subtraction rate computation processing for performing smoothing processing in which the smoothing coefficient is applied to the control gain addition/subtraction rate that corresponds to the previous control section and the control gain addition/subtraction rate that corresponds to the next control section and then computing a post-smoothing addition/subtraction rate.

3. The work control method according to claim 2, wherein as the smoothing coefficient, a combination of a large value and a small value are set for each content of a work instruction to be sent to the construction machine, and
in the smoothing coefficient decision processing, a combination of values of the smoothing coefficient is switched in accordance with the content of the work instruction.

4. The work control method according to claim 2, wherein
as the smoothing coefficient, a combination of a large value and a small value are set for each control target position, and
in the smoothing coefficient decision processing, a combination of values of the smoothing coefficients is switched in accordance with the control target position.

5. The work control method according to claim 1, wherein
the control section includes a plurality of the target positions, which are different from each other, in one period, and
the overshoot computation processing computes an average value or a maximum value of the amounts of overshoot of the plurality of target positions as the amount of overshoot to be provided for the addition/subtraction rate computation processing.

6. The work control method according to claim 1, wherein the control parameter adjustment processing performs processing in parallel to the feedback control processing.

7. The work control method according to claim 1, wherein, in the feedback control processing, the posture of the construction machine is detected in a time period shorter than one control section, and the feedback control input value is computed using a result of the detection.

8. A work control system comprising:
control parameter adjustment means for adjusting a control gain for each control section, which is a unit section of control;
feedback control means for computing a feedback control input value for controlling the posture of a construction machine using the control gain; and
construction machine control means for controlling the posture of the construction machine based on the feedback control input value, wherein
the control parameter adjustment means includes:
overshoot computation means for computing an amount of overshoot of a posture detection value with respect to a target position in a previous control section;
addition/subtraction rate computation means for computing a control gain addition/subtraction rate, which is an addition/subtraction rate of the control gain in the next control section, based on the amount of overshoot;
addition/subtraction rate smoothing processing means for computing a post-smoothing addition/subtraction rate in which the control gain addition/subtraction rate is smoothed based on a post-smoothing addition-subtraction rate computed in the previous control section and the control gain addition/subtraction rate; and
control gain computation means for computing a control gain in the next control section from the post-smoothing addition/subtraction rate.

9. The work control system according to claim 8, wherein the addition/subtraction rate smoothing processing means includes:
smoothing coefficient decision means for rewriting, when the control gain addition/subtraction rate is larger than the post-smoothing addition/subtraction rate computed in the previous control section, a smoothing coefficient in such a way that the smoothing coefficient becomes a small value and then outputting the smoothing coefficient; and
post-smoothing addition/subtraction rate computation means for performing smoothing processing to which the smoothing coefficient is applied to the control gain addition/subtraction rate that corresponds to the previous control section and the control gain addition/subtraction rate that corresponds to the next control section and then computing a post-smoothing addition/subtraction rate.

10. The work control system according to claim 9, wherein
as the smoothing coefficient, a combination of a large value and a small value are set for each control target position, and
the smoothing coefficient decision means switches a combination of values of the smoothing coefficient in accordance with the control target position.

11. The work control system according to claim 8, wherein
the control section includes a plurality of the target positions, which are different from each other, in one period, and
the overshoot computation means computes an average value or a maximum value of the amounts of overshoot of the plurality of target positions as the amount of overshoot to be provided for the addition/subtraction rate computation means.

12. The work control system according to claim 8, wherein the control parameter adjustment means performs processing in parallel to processing by the feedback control means.

13. The work control system according to claim 8, wherein, in the feedback control means, the posture of the construction machine is detected in a time period shorter than one control section, and the feedback control input value is computed using a result of the detection.

14. A work control apparatus comprising:
control parameter adjustment means for adjusting a control gain for each control section, which is a unit section of control; and
feedback control means for computing a feedback control input value for controlling the posture of a construction machine using the control gain, wherein
the control parameter adjustment means includes:
overshoot computation means for computing an amount of overshoot of a posture detection value with respect to a target position in a previous control section;
addition/subtraction rate computation means for computing a control gain addition/subtraction rate, which is an addition/subtraction rate of the control gain in the next control section, based on the amount of overshoot;
addition/subtraction rate smoothing processing means for computing a post-smoothing addition/subtraction rate in which the control gain addition/subtraction rate is smoothed based on a post-smoothing addition-subtraction rate computed in the previous control section and the control gain addition/subtraction rate; and
control gain computation means for computing a control gain in the next control section from the post-smoothing addition/subtraction rate.

15. The work control apparatus according to claim 14, wherein the addition/subtraction rate smoothing processing means includes:
smoothing coefficient decision means for rewriting, when the control gain addition/subtraction rate is larger than the post-smoothing addition/subtraction rate computed in the previous control section, a smoothing coefficient in such a way that the smoothing coefficient becomes a small value and then outputting the smoothing coefficient; and
post-smoothing addition/subtraction rate computation means for performing smoothing processing to which the smoothing coefficient is applied to the control gain addition/subtraction rate that corresponds to the previous control section and the control gain addition/subtraction rate that corresponds to the next control section and then computing a post-smoothing addition/subtraction rate.

16. The work control apparatus according to claim 15, wherein
   as the smoothing coefficient, a combination of a large value and a small value are set for each control target position, and
   the smoothing coefficient decision means switches a combination of values of the smoothing coefficient in accordance with the control target position.

17. The work control apparatus according to claim 14, wherein
   the control section includes a plurality of the target positions, which are different from each other, in one period, and
   the overshoot computation means computes an average value or a maximum value of the amounts of overshoot of the plurality of target positions as the amount of overshoot to be provided for the addition/subtraction rate computation means.

18. The work control apparatus according to claim 14, wherein the control parameter adjustment means performs processing in parallel to processing by the feedback control means.

19. The work control apparatus according to claim 14, wherein, in the feedback control means, the posture of the construction machine is detected in a time period shorter than one control section, and the feedback control input value is computed using a result of the detection.

* * * * *